(12) United States Patent
Ehrstrom et al.

(10) Patent No.: US 10,196,722 B2
(45) Date of Patent: Feb. 5, 2019

(54) METHOD FOR MANUFACTURING A STRUCTURAL ELEMENT HAVING A VARIABLE THICKNESS FOR AIRCRAFT PRODUCTION

(71) Applicant: CONSTELLIUM FRANCE, Paris (FR)

(72) Inventors: Jean-Christophe Ehrstrom, Grenoble (FR); Armelle Danielou, Les Echelles (FR); Timothy Warner, Corenc (FR)

(73) Assignee: CONSTELLIUM ISSOIRE, Issoire (FR)

( * ) Notice: Subject to any disclaimer, the term of this patent is extended or adjusted under 35 U.S.C. 154(b) by 235 days.

(21) Appl. No.: 14/439,300

(22) PCT Filed: Nov. 7, 2013

(86) PCT No.: PCT/FR2013/000287
§ 371 (c)(1),
(2) Date: Apr. 29, 2015

(87) PCT Pub. No.: WO2014/072593
PCT Pub. Date: May 15, 2014

(65) Prior Publication Data
US 2015/0299837 A1 Oct. 22, 2015

Related U.S. Application Data

(60) Provisional application No. 61/725,250, filed on Nov. 12, 2012.

(30) Foreign Application Priority Data

Nov. 8, 2012 (FR) .................................. 12 03006

(51) Int. Cl.
*B32B 3/00* (2006.01)
*C22F 1/057* (2006.01)
(Continued)

(52) U.S. Cl.
CPC ................ *C22F 1/057* (2013.01); *B64C 3/00* (2013.01); *C22C 21/00* (2013.01); *C22C 21/12* (2013.01);
(Continued)

(58) Field of Classification Search
CPC .............. B64C 3/00; B64C 1/00; C22C 21/00
(Continued)

(56) References Cited

U.S. PATENT DOCUMENTS 5,496,426 A 3/1996 Murtha
2005/0279433 A1* 12/2005 Hauger .................... B21B 3/00
148/667

(Continued)

FOREIGN PATENT DOCUMENTS

EP 1595608 A1 11/2005

OTHER PUBLICATIONS

Lequeu et al., Aluminum-Copper-Lithium Alloy 2050 Developed for Medium to Thick Plate, Sep. 1, 2009, Journal of Materials Engineering and Performance (Year: 2009).*

(Continued)

*Primary Examiner* — David Sample
*Assistant Examiner* — Mary I Omori
(74) *Attorney, Agent, or Firm* — McBee Moore Woodward & Vanik IP, LLC; Susan E. Shaw McBee; David L. Vanik

(57) ABSTRACT

The invention relates to the method for manufacturing a rolled product of variable thickness made of heat-treatable aluminum alloy in which hot rolling is performed to achieve a variation in thickness of at least 10% lengthwise between the thickest part and the thinnest part; the rolled product of variable thickness obtained undergoes solution heat-treatment and quenching with permanent set of at least 1% in the thickest part before natural or artificial ageing. The products (Continued)

obtained according to the invention exhibit improved mechanical strength of at least 5% in the thinnest part and improved fracture toughness of at least 15% in the thickest part. The products according to the invention are notably useful in the fabrication of aircraft upper or lower wing skins the "buy to fly" ratio and the properties are simultaneously improved.

20 Claims, 2 Drawing Sheets

(51) Int. Cl.
    *C22C 21/00*       (2006.01)
    *C22C 21/12*       (2006.01)
    *C22C 21/16*       (2006.01)
    *C22F 1/04*        (2006.01)
    *B64C 3/00*        (2006.01)
    *C22C 21/14*       (2006.01)
    *C22C 21/18*       (2006.01)
    *C22F 1/00*        (2006.01)

(52) U.S. Cl.
    CPC .............. *C22C 21/14* (2013.01); *C22C 21/16* (2013.01); *C22C 21/18* (2013.01); *C22F 1/002* (2013.01); *C22F 1/04* (2013.01)

(58) Field of Classification Search
    USPC ........................................................ 428/600
    See application file for complete search history.

(56) References Cited

U.S. PATENT DOCUMENTS

| | | | |
|---|---|---|---|
| 2007/0246137 A1 | 10/2007 | Lequeu et al. | |
| 2011/0278397 A1* | 11/2011 | Bes | C22C 21/00 244/123.1 |
| 2014/0366999 A1* | 12/2014 | Kamat | B22D 21/04 148/551 |

OTHER PUBLICATIONS

International Search Report from corresponding PCT/FR2013/000287, dated May 20, 2014.
French Search Report from corresponding FR 1203006, dated Oct. 21, 2013.
American Society of Metals, "Aluminium vol. III Fabrication & Finishing," ASM, 1967.
The Aluminum Association, "Teal Sheets," The Aluminum Association, Inc., 2015.
The Aluminum Association, "Rolling Aluminum: From the Mine Through the Mill," The Aluminum Association, Inc., 2008.
Notice of opposition to a European patent, EP Patent No. 2917380, EP App. No. 13801604.3; Notice of Opposition commmunicated to patent proprietor Feb. 15, 2018.

* cited by examiner a b c

METHOD FOR MANUFACTURING A STRUCTURAL ELEMENT HAVING A VARIABLE THICKNESS FOR AIRCRAFT PRODUCTION

CROSS REFERENCE TO RELATED APPLICATIONS

This application is a § 371 National Stage Application of PCT/FR2013/000287, filed 7 Nov. 2013, which claims priority to FR 12/03006, filed 8 Nov. 2012 and U.S. 61/725,250, filed 12 Nov. 2012.

BACKGROUND

Field of the Invention

The invention relates to rolled products and structural elements made of aluminum alloy, particularly for aircraft construction.

Description of Related Art

While the competition between the materials for aeronautical construction intensifies, the commercial criteria in the selection of solutions are sometimes crucial. The manufacturer is primarily interested in the price per kilogram of materials in flight which corresponds to the product of the price per kilogram by the "buy to fly" ratio. The "buy to fly" ratio is the ratio between the raw material purchased by the aircraft manufacturer and the raw material mounted in the flying structure. The integral machining of aluminum parts from plates sometimes leads to a significant "buy to fly" ratio, notably for parts such as wing panels for which the required thickness is higher in the area of the wing root than at the wing tip. A plate is a rolled product having a rectangular cross-section of uniform thickness. For the fabrication of aeronautical structural elements, plates are currently used regardless of the final geometry of the part produced. Modification of the geometry of the plate, even if it is justified to save material has not yet been adopted by aircraft manufacturers as it presents disadvantages in terms of manufacturing, inspection and handling and because it does not allow for rapid transfer directly to the existing methods.

In addition, it is advantageous to produce monolithic metallic structural elements having variable properties in space so to obtain an optimum compromise of properties in each zone.

FR 2 707 092 describes a method for manufacturing structural age-hardened products, having continuously variable properties in at least one direction, in which aging is performed by bringing one end to temperature T and the other end to a temperature t in a special furnace comprising a hot chamber and a cold chamber connected through a heat pump.

WO 2005/098072 describes a method for manufacturing in which at least one step of the aging treatment is carried out in a furnace with a controlled thermal profile comprising at least two zones or groups of zones $Z_1$ and $Z_2$ with initial temperatures $T_1$ and $T_2$ in which the length of the two zones is at least one meter.

WO2007/122314 relates to a method for manufacturing a work-hardened product or a monolithic multi-functional structural element made of an aluminum alloy comprising a hot working step characterized in that after the hot working step, it also comprises at least one working step by cold plastic deformation in which different general deformations are imposed on at least two zones of the structural element, with a difference of at least 2% and preferably at least 3%. However, the methods described in this application are not implemented on an industrial scale.

Furthermore, US 2005/0279433 describes a method of flat-rolling a plate to obtain a variable thickness along its length, particularly suitable for aluminum or magnesium plates.

The problem addressed by this invention is to develop a method for manufacturing rolled products and monolithic structural elements made of aluminum alloy, notably for aircraft construction, having an improved "buy to fly" ratio and presenting compromises of optimized properties in each part.

SUMMARY

A first subject of the invention is a method for manufacturing a rolled product of variable thickness made of heat-treatable aluminum alloy, in which
a. a slab made of heat-treatable aluminum alloy is cast,
b. optionally, said slab is homogenized,
c. said optionally homogenized slab is hot rolled, by achieving a lengthwise thickness variation to obtain a rolled product of variable thickness, having a thicker part and a thinner part, the difference in thickness of which is at least 10%,
d. said rolled product of variable thickness is solution heat-treated and quenched,
e. said rolled product of variable thickness, thus solution heat-treated and quenched, is stress relieved by controlled stretching, with a permanent set of at least 1% in the thickest part,
f. the rolled product so obtained is naturally or artificially aged.

Another subject of the invention is a rolled product of variable thickness obtained by the method according to the invention having a thicker part and a thinner part, the thickness of which differs by at least 10% and having the following properties at mid-thickness: a tensile yield stress $R_{p0.2}$ (L) in the thinnest part at least 5% greater than that in the thickest part and a fracture toughness $K_{1C}$ L–T in the thickest part at least 15% greater than that in the thinnest part.

Yet another subject of the invention is the use of a rolled product of variable thickness obtained by the method according to the invention as a monolithic structural element for aircraft and preferably as an upper or lower wing skin.

DETAILED DESCRIPTION OF A PREFERRED EMBODIMENT

Figure 1:
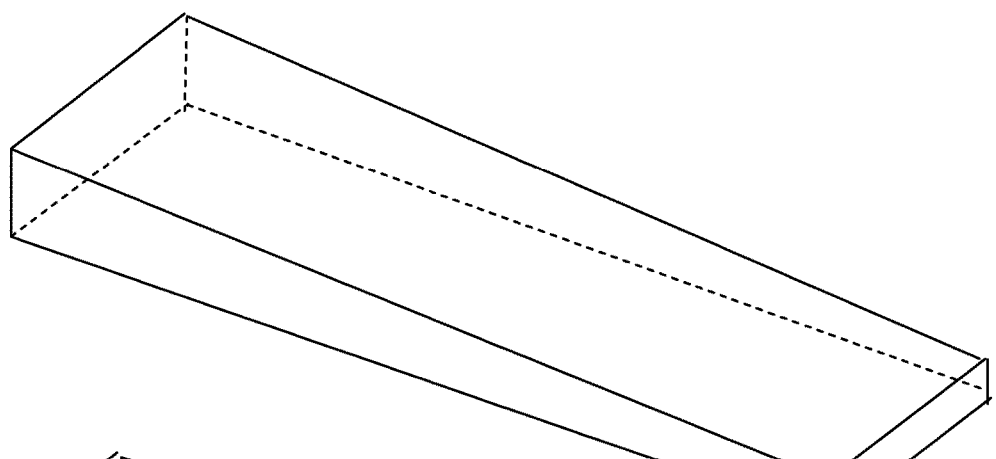
FIG. 1: Different geometry examples of rolled product of variable thickness obtained by the method according to the invention.
Figure 1:
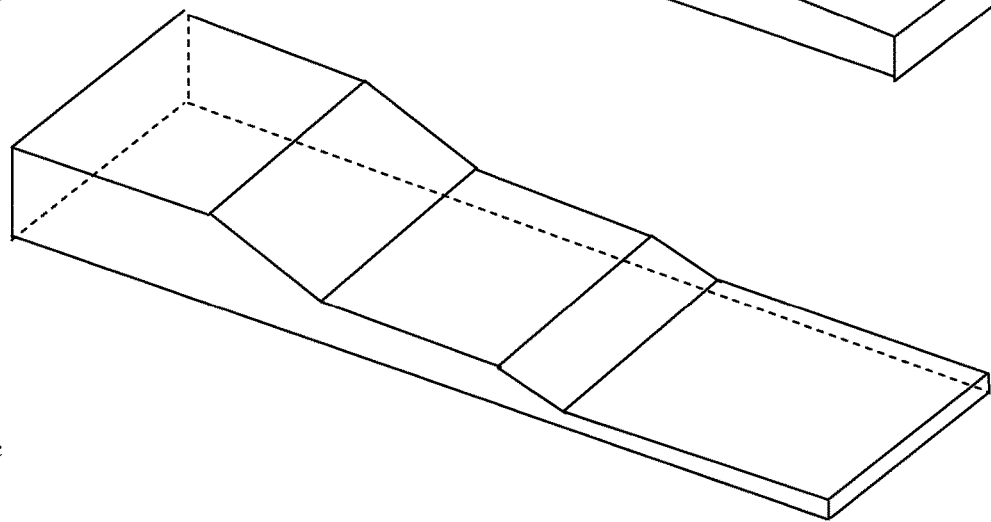
Figure 1:
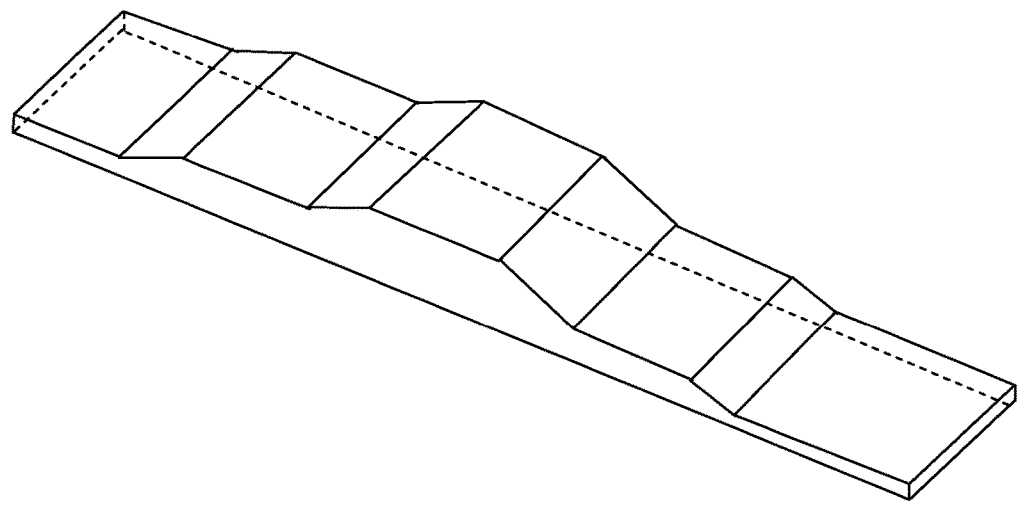

Unless otherwise stated, all indications relative to the chemical composition of the alloys are expressed in percentage by weight. The names of alloys follow the rules of The Aluminum Association, known to the skilled person. The metallurgical tempers and the thermal heat treatments are defined in European standard EN 515. The chemical composition of standardized aluminum alloys is defined for example in standard EN 573-3. The tensile static mechanical properties, in other words the ultimate tensile strength $R_m$, the conventional tensile yield stress at 0.2% offset ($R_{p0.2}$) and elongation at break A%, are determined by a tensile test according to standard EN ISO 6892-1, sampling and test direction being defined by standard EN 485-1. The yield stress under compression is measured at 0.2% of plastic deformation under compression as per standard ASTM E9. The plane strain fracture toughness measurement $K_{1C}$ is conducted as per ASTM E399. In the case where $K_{1C}$ values outside this standard are obtained, the value of $K_{1C}$ indicated is $K_Q$, measured with the thickest CT specimen that can be taken from the rolled product, and a length/thickness ratio of the specimen of 2.

Unless otherwise specified, the definitions of European standard EN 12258-1 apply: in particular, the term "non-heat-treatable alloy" is defined as an alloy that cannot be substantially hardened by heat treatment, and the term "heat-treatable alloy" is defined for an alloy that can be hardened by an appropriate heat treatment.

The term "structural element" refers to an element used in mechanical engineering for which the static and/or dynamic mechanical properties are of particular importance for the performance and the integrity of the structure, and for which a structural analysis is generally prescribed or carried out. This is typically a mechanical part whose failure is likely to endanger the safety of said construction, its users or others. In the context of the present invention a structural element is typically a part mounted in a flying structure. For an aircraft, these structural elements include the parts which make up the fuselage, such as the fuselage skin, stringers, bulkheads, and circumferential frames, the wings (such as the upper or lower wing skin), stringers or stiffeners, ribs and spars and the tail unit, made up of horizontal and vertical stabilizers, as well as floor beams, seat tracks and doors.

Within the scope of the present invention, the term "monolithic structural element" refers to a structural element that was obtained from a single piece of rolled semifinished product, without assembly with another piece through riveting, welding or bonding.

According to the invention, a rolled product of variable thickness made of heat-treatable aluminum alloy is obtained by a method in which:
  a. a slab made of heat-treatable aluminum alloy is cast,
  b. optionally, said slab is homogenized,
  c. said optionally homogenized slab is hot rolled, by achieving a lengthwise thickness variation to obtain a rolled product of variable thickness, having a thicker part and a thinner part, the difference in thickness of which is at least 10%,
  d. said rolled product of variable thickness is solution heat-treated and quenched,
  e. said rolled product of variable thickness, thus solution heat-treated and quenched, is stress relieved by controlled stretching, with a permanent set of at least 1% in the thickest part,
  f. the rolled product so obtained is naturally or artificially aged.

The method according to the invention is particularly advantageous for alloys of the 2XXX series for which the stretching and compression properties after ageing are increased by the deformation between quenching and ageing. The process is especially advantageous for alloys of the 2XXX series containing at least 0.5% by weight of lithium in a T8 or T8X metallurgical temper as the tensile properties after ageing are particularly increased by the deformation between quenching and aging for this type of alloy.

The homogenization of the rolling slab is particularly advantageous to avoid breakage during rolling, to facilitate solution heat-treatment and to ensure better control of the granular structure.

Hot rolling to a variable thickness is performed to obtain a lengthwise difference in thickness of at least 10% between the thickest part and the thinnest part. The variation in thickness is obtained either progressively over a great length, which may include the entire length of the rolled product itself, or by at least one relatively local variation that nevertheless helps to prevent breakage during stretching as a result of stress concentration, for example over a length of 0.5 m. The terms "thickest part" or "thinnest part" designate the continuous portions of the rolled product, measuring at least one meter in length, whose average thickness is the highest or the lowest, respectively. The difference in thickness, expressed as a percentage, is equal to the difference between the thickness of the thickest part and that of the thinnest part divided by the thickness of the thinnest part, the thickness of the thickest part being the average thickness of the thickest part and the thickness of the thinnest part being the average thickness of the thinnest part. Advantageously, said difference in thickness is at least 20%. In an embodiment of the invention, said difference in thickness is at least 30%. Typically, the difference in thickness between the thickest part and the thinnest part is approximately 2 mm or 4 mm or more depending on the thickness. Preferably, the thickness is homogenous along the width. The variation in thickness can be continuous over the entire length of the rolled product, as illustrated in FIG. 1a or have parts of uniform thickness that are interconnected by parts of variable thickness having a length of approximately one meter or more, as illustrated in FIG. 1b. In an embodiment of the invention illustrated in FIG. 1c, the thickness of the rolled product of variable thickness is identical at both ends, the thickest part or the thinnest part typically being located at mid-length. In this embodiment, the rolled product is cut into two halfway along its length before machining to obtain a structural element. This embodiment is advantageous because during stretching, the thickness of the parts located in the jaws is identical.

The thickness of said rolled product is advantageously between 10 mm and 50 mm and preferably between 12 mm and 30 mm. In an embodiment of the invention, the thickest part has a thickness between 20 mm and 30 mm, and the thinnest part has a thickness between 10 mm and 20 mm.

Advantageously, the length of said rolled product is between 5 m and 40 m and preferably between 10 m and 30 m.

The duration and temperature of the rolled product's solution heat-treatment process is sufficient to ensure that solution heat-treatment is satisfactory in the thickest part. Thus, solution heat-treatment is also ensured in the thinnest part.

Similarly, quenching is dimensioned for the thickest part of the product.

After quenching, the internal stresses are relieved by controlled stretching. Furthermore, the rolled products with variable thickness obtained must be cut and/or machined to produce structural elements, notably for aircraft, and during these steps the internal stresses must be minimal. A permanent set of at least 1% in the thickest part is thus required. In addition, in 2XXX series alloys, this permanent set is generally a prerequisite for obtaining the targeted mechanical properties.

During controlled stretching of the product of variable thickness, the permanent set varies according to the position along the length. This variation has been identified as a difficulty owing to the inspection problem regarding the product obtained. Surprisingly however, this variation is an advantage in obtaining products with optimal properties throughout. The permanent set is lower in the thick part than in the thin part. Typically, the permanent set in the thinnest part is at least 3% when the permanent set in the thickest part is at least 1%. For the majority of 2XXX alloys, a greater permanent set leads to greater mechanical strength while the fracture toughness is high when the set is less, notably for T8 tempers. However, beyond a certain threshold, the gain in mechanical strength obtained through permanent set during controlled stretching becomes low and the advantage of balancing properties is thus negligible while the practical problems associated with achieving a high strain rate are significant. Advantageously, the permanent set in the thinnest part is thus at most 8% and preferably it is at most 6%. For aeronautical structural elements such as lower wing skin or upper wing skin, the desired properties are high mechanical strength and sufficient fracture toughness at the wing tip and a high fracture toughness and sufficient mechanical strength toward the wing root. In addition, for wing panels, a greater thickness is required at the wing root than at the wing tip. In this way, the structural element has a shape closer to the rolled product derived from the process according to the invention than in prior art in which the structural element is machined from a metal sheet. Advantageously, the volume of material, i.e. of aluminum alloy, to be removed by machining between the rolled product derived from the process according to the invention and the structural member is at least 10% lower and preferably at least 15% lower than the volume of material to be removed between a metal sheet/plate and the same structural element. Preferably, the convex envelope of the structural element does not deviate by more than 8 mm and preferably by more than 5 mm from the rolled product derived from the process according to the invention. The convex envelope of an object is the smallest convex set among those that contain it, a convex set being a geometrical object such that each time two points A and B are taken, the segment [A, B] joining them is entirely contained therein. The method according to the invention thus leads to structural elements, notably wing panels, that are particularly well suited to the needs of aircraft manufacturers: the thickness is greatest in the area having the highest fracture toughness which is appropriate for the wing root, and the thickness lowest in the area having the lowest mechanical strength which will be appropriate for the wing tip. The "buy to fly" ratio and the properties of the product are thus improved simultaneously; however the thickness of the various parts is preferably chosen based on the final properties sought, taking into account the changes in the final properties with the permanent set during stretching, and not as a function of the shape of the structural element.

Advantageously, the permanent set during controlled stretching is between 1% and 3% in the thickest part and between 4% and 6% in the thinnest part.

After stress relieving by controlled stretching, the rolled product is naturally aged to obtain a T3 or T3X temper or artificially aged. Preferably, artificial aging leads to a T8 or T8X temper.

Alloys of the 2XXX series AA2022, AA2023, AA2024, AA2024A, AA2124, AA2224, AA2324, AA2424 AA2524, AA2026 and AA2027 are particularly suited for implementing the process according to the invention at a T3 or T3X temper.

Alloys of the 2XXX series AA2618, AA2219, AA2519, AA2124, AA2139, AA2050, AA2055, AA2060, AA2076, AA2090, AA2091, AA2094, AA2095, AA2195, AA2295, AA2196, AA2296, AA2097, AA2197, AA2297, AA2397, AA2098, AA2198, AA2099 and AA2199 are particularly suited for implementing the process according to the invention at T8 or T8X temper.

The rolled product of variable thickness so obtained is advantageously used to manufacture monolithic structural elements for aircraft. The structural element so obtained exhibits advantageous properties in the thickest part and in the thinnest part. The use of a rolled product of variable thickness obtainable by the process according to the invention for the fabrication of an upper or lower wing skin is particularly advantageous.

The rolled product of variable thickness obtained by the process according to the invention exhibits a thicker part and a thinner part, the thickness of which differs by at least 10% and having the following properties at mid-thickness: a tensile yield stress $R_{p0.2}$ (L) in the thinnest part at least 5% greater than that in the thickest part and a fracture toughness $K_{1C}$ L–T in the thickest part at least 15% greater than that in the thinnest part. Advantageously, when the tensile yield stress $R_{p0.2}$ (L) in the thinnest part is at least 5% greater than that in the thickest part, the fracture toughness $K_{1C}$ L–T in the thickest part is at least 40% greater than that in the thinnest part and when the fracture toughness $K_{1C}$ L–T in the thickest part is at least 15% greater than that in the thinnest part, the tensile yield stress $R_{p0.2}$ (L) in the thinnest part is at least 25% greater than that in the thickest part. A wing skin obtained from a rolled product according to this embodiment is particularly advantageous.

In an embodiment of the invention, the rolled product of variable thickness is obtained with a 2XXX alloy containing at least 0.5% of lithium by weight, and advantageously an alloy chosen from AA2050, AA2060, AA2076, AA2196 and AA2296 and presents for a T8 or T8X temper a thicker part and a thinner part, the thickness of which differs by at least 10% and the thicker part of which has an average thickness between 20 mm and 30 mm and the following properties at mid-thickness: a tensile yield stress $R_{p0.2}$(L)>340 MPa and preferably tensile $R_{p0.2}$(L)>360 MPa and $K_{1C}$ L–T>41 MPa m$^{1/2}$ and preferably 44 MPa m$^{1/2}$ and the thinnest part of which has an average thickness between 10 mm and 20 mm and the following properties at mid-thickness: tensile $R_{p0.2}$ (L)>440 MPa and preferably tensile $R_{p0.2}$(L)>480 MPa and $K_{1C}$ L–T>28 MPa m$^{1/2}$ and preferably 32 MPa m$^{1/2}$. A lower wing skin obtained from a rolled product according to this embodiment is particularly advantageous.

In another embodiment of the invention, the rolled product of variable thickness is obtained with a 2XXX alloy containing at least 0.5% of lithium by weight, and advantageously an alloy chosen from AA2195, AA2295 and AA2055 and presents for a T8 or T8X temper a thicker part and a thinner part, the thickness of which differs by at least 10% and the thicker part of which has an average thickness between 20 mm and 30 mm and the following properties at mid-thickness: a tensile yield stress $R_{p0.2}$(L)>580 MPa and preferably tensile $R_{p0.2}$(L)>590 MPa and $K_{1C}$ L–T>30 MPa m$^{1/2}$ and preferably 32 MPa m$^{1/2}$ and the thinnest part of which has an average thickness between 10 mm and 20 mm and the following properties at mid-thickness: tensile $R_{p0.2}$ (L)>600 MPa and preferably tensile $R_{p0.2}$(L)>625 MPa and $K_{1C}$ L–T>18 MPa m$^{1/2}$ and preferably 20 MPa m$^{1/2}$. A wing top skin obtained from a rolled product according to this embodiment is particularly advantageous.

EXAMPLES

In this example, for various alloys, a rolled product measuring 20 m in length is produced, the thickness of which varies continuously between one end of thickness 15.7 mm and the other end of thickness 22 mm.

Three alloys are considered: alloys AA2195, AA2050 and AA2196. Alloy 2196 has the advantage of having a density of typically 2.64 as opposed to approximately 2.70 for the other two alloys. Alloy 2196 may also have a resistance to fatigue crack propagation greater than that of alloy 2050.

Figure 2:
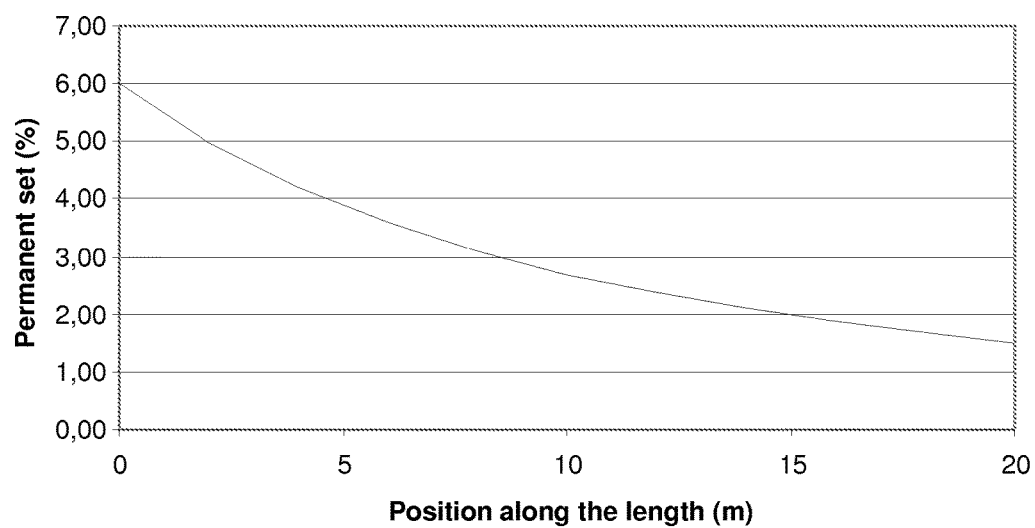
FIG. 2: Permanent set during stress relieving by controlled stretching according to the position in the length for the rolled product of variable thickness of the example.

Plates made of AA2195, AA2050 and AA2196 alloy are cast and homogenized. The rolling slabs are hot-rolled so as to obtain a rolled product measuring 20 m in length, the thickness of which varies continuously between one end of thickness 15.7 mm and the other end of thickness 22 mm. The rolled products of variable thickness thus obtained are solution heat-treated and quenched. The rolled products of variable thickness, thus solution heat-treated and quenched, are then stress relieved by controlled stretching. The permanent set obtained is presented based on the position along the length in FIG. 2, the thickness being 15.7 mm for position "0 m" and 22 mm for position "20 m". The rolled products are then aged to T8 temper.

The mechanical properties measured at mid-thickness, obtained at each end, are presented in Table 1.

TABLE 1

Mechanical properties obtained at mid-thickness.

| | 22 mm thick part | | | 15.7 mm thick part | | |
|---|---|---|---|---|---|---|
| Alloy | $Rp_{0.2}$ L Stretching (MPa) | $Rp_{0.2}$ L Compressive (MPa) | $K_{1C}$ (MPa · m$^{1/2}$) L-T ( | $Rp_{0.2}$ L Stretching (MPa) | $Rp_{0.2}$ L Compressive (MPa) | $K_{1C}$ (MPa · M$^{1/2}$) L-T |
| AA2195 | 590 | 600 | 33 | 635 | 620 | 22 |
| AA2050 | 380 | | 45 | 505 | | 38 |
| AA2196 | 350 | | 44 | 450 | | 30 |

For alloy AA2195, the yield stress $R_{p0.2}$L is 8% greater in the thinnest part than in the thickest part and the fracture toughness $K_{1C}$L-T is 50% greater in the thickest part than in the thinnest part. For alloy AA2050, the yield stress $R_{p0.2}$L is 33% greater in the thinnest part than in the thickest part and the fracture toughness $K_{1C}$L-T is 18% greater in the thickest part than in the thinnest part. For alloy AA2196, the yield stress $R_{p0.2}$L is 29% greater in the thinnest part than in the thickest part and the fracture toughness $K_{1C}$L-T is 47% greater in the thickest part than in the thinnest part. Alloy AA2196 also has the advantage of being less dense than alloy AA2050.

The invention claimed is:

1. A rolled product of variable thickness having a thicker part and a thinner part, the thickness of which differs by at least 10% and having the following properties at a mid-thickness: a tensile yield stress $R_{p0.2}$ (L) in the thinner part at least 5% greater than that in the thicker part and a fracture toughness $K_{1C}$ L-T in the thickest part at least 15% greater than that in the thinner part, wherein the rolled product is obtained by a method, in which:
   a. a slab made of heat-treatable aluminum alloy is cast,
   b. optionally, said slab is homogenized,
   c. said optionally homogenized slab is hot rolled, by achieving a lengthwise thickness variation to obtain the rolled product of variable thickness, having the thicker part and the thinner part, the difference in thickness of which is at least 10%,
   d. said rolled product of variable thickness is solution heat-treated and quenched,
   e. said rolled product of variable thickness, thus solution heat-treated and quenched, is stress relieved by controlled stretching, with a permanent set of at least 1% in the thickest part, and
   f. the rolled product so obtained is naturally or artificially aged, wherein a thickness of said rolled product is between 10 mm and 50 mm.

2. The rolled product according to claim 1, wherein the thickness of said rolled product is between 12 mm and 30 mm.

3. The rolled product according to claim 1, wherein said rolled product has two ends and the thickness of said rolled product is identical at both of said ends, said thicker part or said thinner part being located at a mid-length.

4. The rolled product of variable thickness according to claim 1 having the thicker part and the thinner part, the thickness of which differs by at least 10% and the thicker part of which has an average thickness between 20 mm and 30 mm and the following properties at the mid-thickness: the tensile yield stress $R_{p0.2}$(L) >340 MPa and the fracture toughness $K_{1C}$ L-T >41 MPa m$^{1/2}$ and the thinner part of which has an average thickness between 10 mm and 20 mm and the following properties at the mid-thickness: the tensile yield stress $R_{p0.2}$(L) >440 MPa and the fracture toughness $K_{1C}$ L-T >28 MPa m$^{1/2}$.

5. The rolled product according to claim 4 wherein said heat-treated aluminum alloy is selected from the group consisting of AA2050, AA2060, AA2076, AA2196 and AA2296.

6. A lower wing skin obtained from the rolled product according to claim 4.

7. The rolled product of variable thickness according to claim 1 having the thicker part and the thinner part, the thickness of which differs by at least 10% and the thicker part of which has an average thickness between 20 mm and 30 mm and the following properties at the mid-thickness: the tensile yield stress $R_{p0.2}$(L) >580 MPa and and the fracture toughness $K_{1C}$ L-T >30 MPa m$^{1/2}$ and the thinner part of which has an average thickness between 10 mm and 20 mm and the following properties at the mid-thickness: the tensile yield stress $R_{p0.2}$(L) >600 MPa and and the fracture toughness $K_{1C}$ L-T >18 MPa m$^{1/2}$.

8. The rolled product according to claim 7 wherein said heat-treatable aluminum alloy is selected from the group consisting of AA2195, AA2295 and AA2055.

9. An upper wing skin obtained from the rolled product according to claim 7.

10. The rolled product of variable thickness according to claim 1, having the thicker part and the thinner part, the thickness of which differs by at least 20%.

11. The rolled product of variable thickness according to claim 1, wherein the thicker part has an average thickness between 20 mm and 30 mm, and the thinner part has an average thickness between 10 mm and 20 mm.

12. The rolled product of variable thickness according to claim 1, having the thicker part and the thinner part, the thickness of which differs by at least 10% and having the following properties at the mid-thickness: when the tensile yield stress $R_{p0.2}$ (L) in the thinner part is at least 5% greater than that in the thicker part, the fracture toughness $K_{1C}$ L–T in the thicker part is at least 40% greater than that in the thinner part, and/or when the fracture toughness $K_{1C}$ L–T in the thicker part is at least 15% greater than that in the thinner part, the tensile yield stress $R_{p0.2}$ (L) in the thinner part is at least 25% greater than that in the thicker part.

13. The rolled product of variable thickness according to claim 1, wherein the rolled product is obtained by the method, in which (b) the slab is homogenized.

14. The rolled product of variable thickness according to claim 13, wherein the rolled product is obtained by the method, in which (c) the homogenized slab is hot rolled, by achieving the lengthwise thickness variation to obtain the rolled product of variable thickness, having the thicker part and the thinner part, the difference in thickness of which is at least 10%, said rolled product of variable thickness is solution heat-treated and quenched, and wherein which steps (a) to (f) are performed in order.

15. A method for manufacturing a rolled product of variable thickness made of heat-treatable aluminum alloy of claim 1, in which
   a. a slab made of heat-treatable aluminum alloy is cast,
   b. optionally, said slab is homogenized,
   c. said optionally homogenized slab is hot rolled, by achieving the lengthwise thickness variation to obtain the rolled product of variable thickness, having the thicker part and the thinner part, the difference in thickness of which is at least 10%,
   d. said rolled product of variable thickness is solution heat-treated and quenched,
   e. said rolled product of variable thickness, thus solution heat-treated and quenched, is stress relieved by controlled stretching, with a permanent set of at least 1% in the thickest part,
   f. the rolled product so obtained is naturally or artificially aged; and
   wherein the thickness of said rolled product is between 10 mm and 50 mm.

16. The method according to claim 15 wherein the permanent set during controlled stretching is between 1% and 3% in the thicker part and between 4% and 6% in the thinner part.

17. The method for manufacturing according to claim 15 wherein said alloy is a 2XXX alloy.

18. The method according to claim 17 wherein said alloy contains at least 0.5% lithium by weight and the metallurgical temper obtained after artificial ageing is T8 or T8X.

19. A rolled product of variable thickness obtained by the process according to claim 15 capable of being used for manufacture of a monolithic structural element for aircraft and optionally as an upper and/or lower wing skin.

20. A rolled product according to claim 19 wherein the volume of material to be removed by machining between said rolled product and said structural element is at least 10% lower and optionally at least 15% lower than the volume of material to be removed between a metal sheet/plate and the same structural element and/or the convex envelope of said structural element does not deviate by more than 8 mm and optionally more than 5 mm from said rolled product.

* * * * *